US 6,536,606 B2

(12) United States Patent
Schneider et al.

(10) Patent No.: US 6,536,606 B2
(45) Date of Patent: Mar. 25, 2003

(54) SLUDGE COLLECTOR WITH ENTRAPMENT PLATE

(75) Inventors: Jeffrey J. Schneider, Mukwonga, WI (US); Robert J. Fedie, Mukwonga, WI (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/912,268

(22) Filed: Jul. 24, 2001

(65) Prior Publication Data

US 2003/0019810 A1 Jan. 30, 2003

(51) Int. Cl.[7] .............................................. B01D 21/18
(52) U.S. Cl. ..................................... 210/528; 210/532.1
(58) Field of Search ................................. 210/523, 525, 210/528, 532.1

(56) References Cited

U.S. PATENT DOCUMENTS

| | | | |
|---|---|---|---|
| 1,668,063 A | * 5/1928 | Force | .......................... 210/528 |
| 1,717,764 A | * 6/1929 | D'Olier | ........................ 210/528 |
| 2,003,357 A | 6/1935 | Gilchrist | |
| 2,233,619 A | 3/1941 | Linch | |
| 2,525,842 A | 10/1950 | Thompson et al. | |
| 2,624,704 A | 1/1953 | Fischer et al. | |
| 2,635,757 A | 4/1953 | Walker | |
| 2,678,730 A | 5/1954 | Coulter | |
| 2,980,934 A | * 4/1961 | Steindorf | ..................... 210/528 |
| 3,166,502 A | * 1/1965 | Kelly | .......................... 210/528 |
| 3,494,462 A | 2/1970 | Baud | |
| 3,717,257 A | 2/1973 | Boyle | |
| 3,947,355 A | 3/1976 | Irwin | |
| 4,592,835 A | 6/1986 | Grieder et al. | |
| 5,340,485 A | * 8/1994 | Bradley et al. | ............. 210/525 |
| 5,422,006 A | 6/1995 | Huber | |
| 5,435,924 A | 7/1995 | Albertson | |
| 6,068,134 A | 5/2000 | Shurtleff | |

* cited by examiner

*Primary Examiner*—Christopher Upton
(74) *Attorney, Agent, or Firm*—Michael Best & Friedrich LLP

(57) ABSTRACT

The present invention is directed to a sludge collector for use with a circular clarifier. The circular clarifier includes a tank that has a bottom and a wall that extends upwardly from the bottom of the tank. The tank is configured to contain a solution and allow sludge to settle from the solution to the bottom of the tank. The sludge collector includes a withdrawal manifold, a scraper assembly, and an entrapment plate. The withdrawal manifold is located at the bottom of the tank. The scraper assembly extends from the withdrawal manifold toward the wall of the tank and moves the settled sludge toward the withdrawal manifold. The entrapment plate extends between the withdrawal manifold and the scraper assembly to trap sludge between the withdrawal manifold and the scraper assembly and funnels the trapped sludge into the withdrawal manifold.

18 Claims, 3 Drawing Sheets

SLUDGE COLLECTOR WITH ENTRAPMENT PLATE

FIELD OF THE INVENTION

The invention relates to circular clarifiers, and more particularly, to sludge collectors used in circular clarifiers.

BACKGROUND OF THE INVENTION

Circular clarifiers typically include a tank, a center pier, and a sludge collector. The tank is cylindrically shaped and is capable of containing a solution. The center pier projects from the bottom of the tank along a central axis and includes inlet ports. A solution containing suspended solids is supplied to the center of the tank from the inlet ports such that the solution gradually moves radially outwardly toward the wall of the tank. As the solution flows outwardly, solids settle from the solution onto the tank floor thereby separating the solids from the solution. The clarified liquid is removed from the tank through outlet ports located along the tank wall near the surface of the solution.

Sludge collectors retrieve the sludge that settles from the solution onto the bottom of the tank. Sludge collectors typically include a withdrawal manifold and a scraper assembly. The withdrawal manifold is centrally mounted for rotation about the center pier. The scraper assembly is generally spiral-shaped such that rotation of the scraper assembly moves the settled sludge toward the center of the tank and into the withdrawal manifold where it is removed by a sludge withdrawal line.

SUMMARY OF THE INVENTION

The present invention is directed to an entrapment plate that provides a physical barrier for trapping transported sludge between the withdrawal manifold and the scraper assembly and funneling the trapped sludge into the withdrawal manifold of the sludge collector. The entrapment plate of the present invention minimizes the carryover of concentrated sludge over the scraper assembly by providing a physical barrier that holds the sludge below the height of the scraper assembly instead of solely relying on small differences in the specific gravities of different sludge concentrations to hold the sludge in front of the scraper assembly. The entrapment plate also allows the size of the withdrawal ports to be increased, thereby decreasing the exit velocity through the withdrawal ports and minimizing the infusion of lesser concentrated sludge into the rotating withdrawal manifold.

One embodiment of the present invention is directed to a sludge collector for use with a circular clarifier. The circular clarifier includes a tank that has a bottom and a wall that extends upwardly from the bottom of the tank. The tank is configured to contain a solution and allow sludge to settle from the solution to the bottom of the tank. The sludge collector includes a withdrawal manifold, a scraper assembly, and an entrapment plate. The withdrawal manifold is located at the bottom of the tank. The scraper assembly extends from the withdrawal manifold toward the wall of the tank and moves the settled sludge toward the withdrawal manifold. The entrapment plate extends between the withdrawal manifold and the scraper assembly to trap sludge between the withdrawal manifold and the scraper assembly and funnels the trapped sludge into the withdrawal manifold.

Other features and advantages of the invention will become apparent to those skilled in the art upon review of the following detailed description, claims, and drawings.

Figure 2:
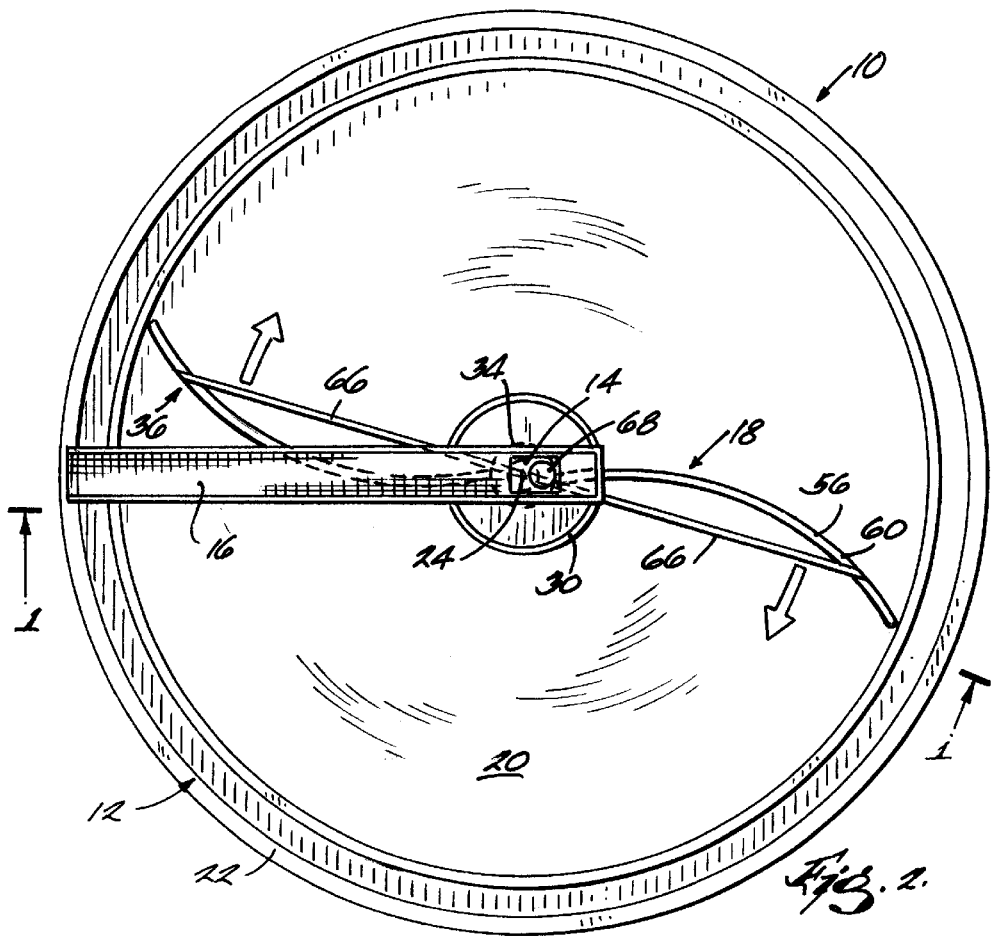
FIG. 2 is a top view illustrating the circular clarifier shown in FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 1:
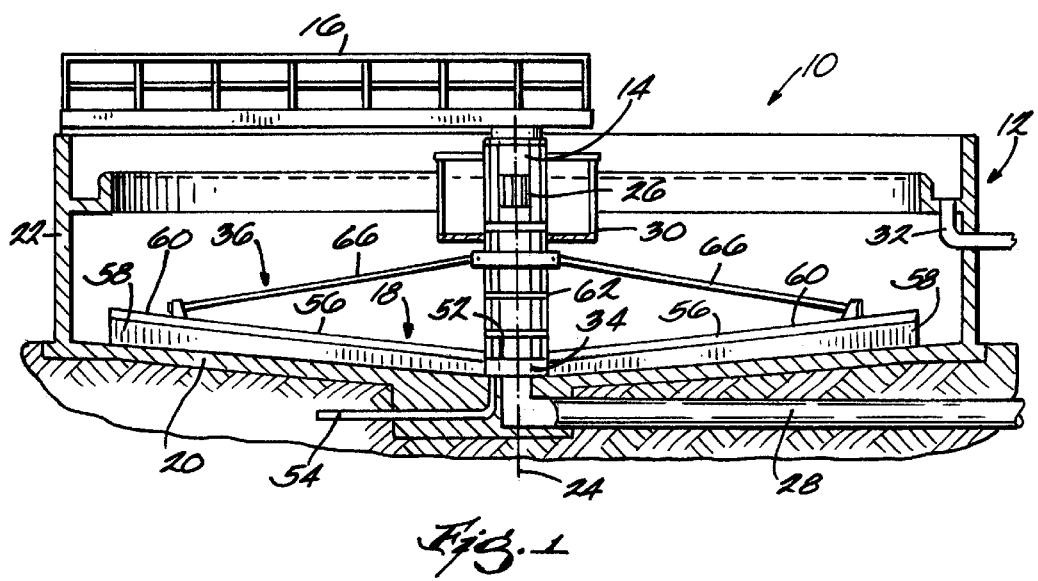
FIG. 1 is a cross-section elevation view of a circular clarifier of the present invention.
Figure 3:
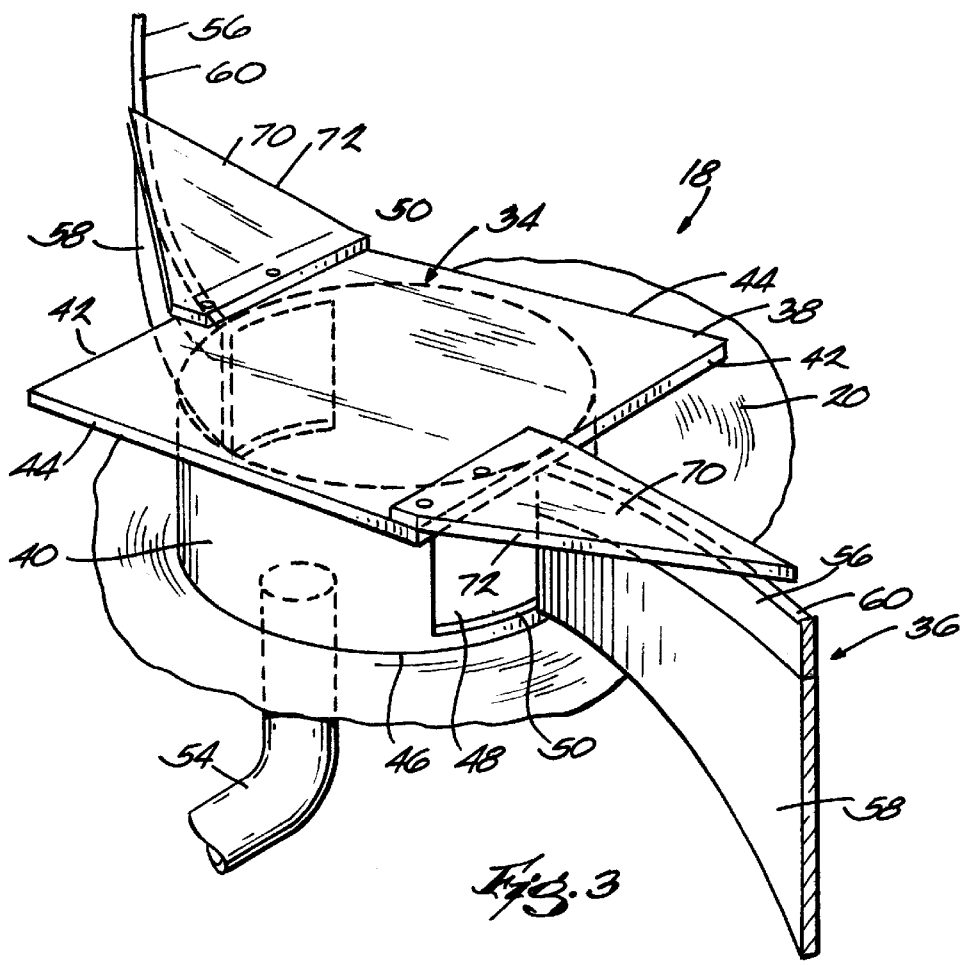
FIG. 3 is an enlarged perspective view of the sludge collector shown in FIG. 1.
Figure 5:
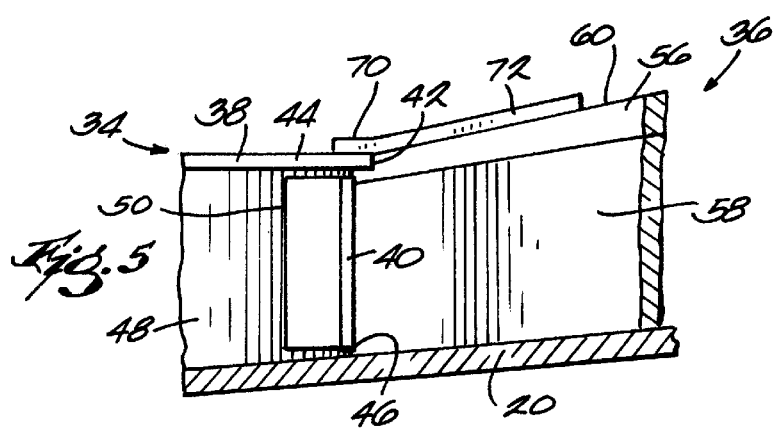
FIG. 5 is a cross-section view taken along line 5—5 in FIG. 4.
Figure 4:
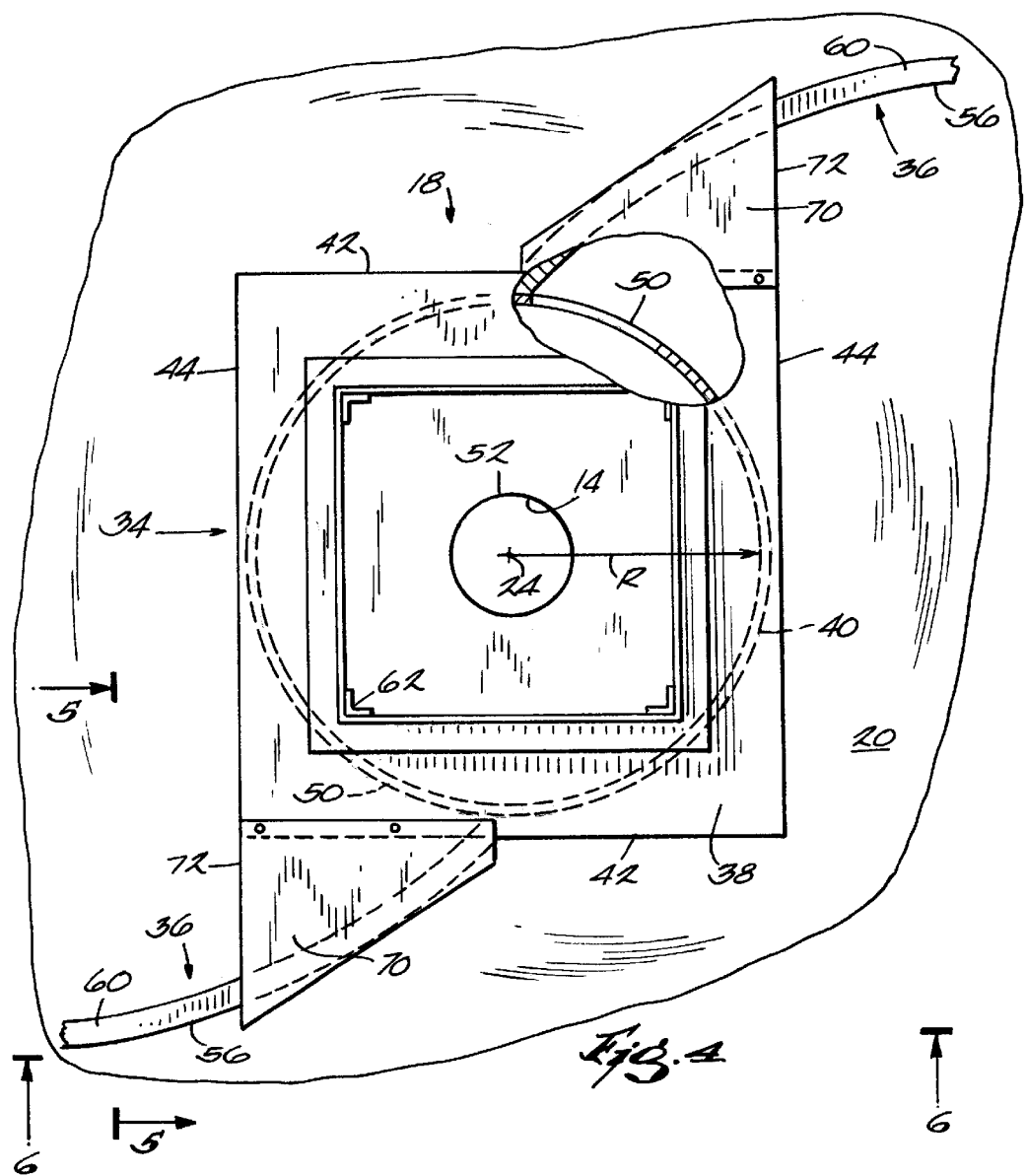
FIG. 4 is a top view illustrating the sludge collector shown in FIG. 3.
Figure 6:
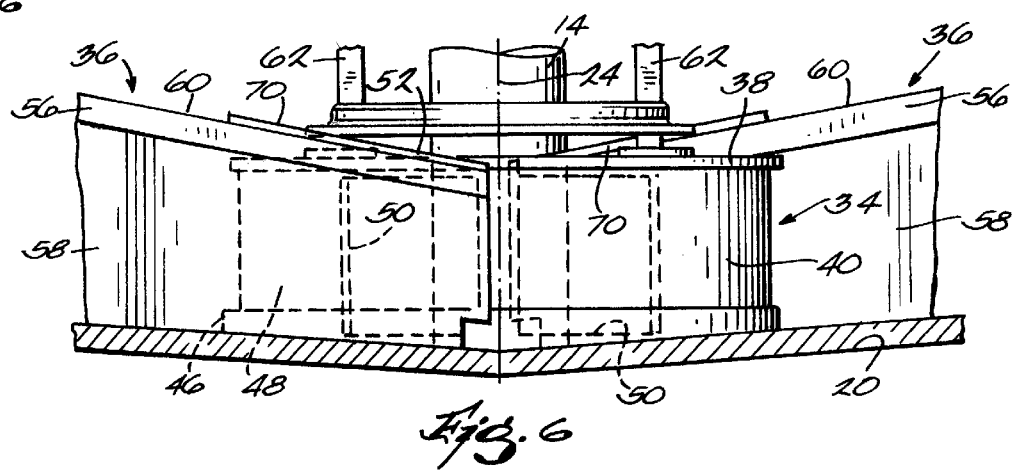
FIG. 6 is a cross-section view taken along line 6—6 in FIG. 4.

FIGS. 1 and 2 illustrate a circular clarifier 10 that is used to remove solids from a solution. The circular clarifier 10 includes a tank 12, a center pier 14, an access bridge 16, and a sludge collector 18. The tank 12 is cylindrically shaped and is capable of containing the solution having suspended solids. The tank 12 includes a bottom 20 and a wall 22 that extends upwardly from the bottom 20. The center pier 14 projects from the bottom 20 of the tank 12 along a central axis 24 and includes inlet ports 26. The bridge 16 is connected to a wall 22 of the tank 12 and to the center pier 14 such that the access bridge 16 extends radially from the center of the tank 12 to the wall 22 of the tank 12. A solution containing suspended solids is supplied to the center of the tank 12 from an influent line 28 through the inlet ports 26 of the center pier 14. The solution is directed radially outwardly from the inlet ports 26 toward the wall 22 of the tank 12. The solution moves through a diffuser 30 to reduce the flow energy of the solution such that the solution gradually moves radially outwardly toward the wall 22 of the tank 12. As the solution slowly flows outward, suspended solids settle from the solution onto the bottom 20 of the tank 12 thereby separating the solids from the solution. The clarified liquid is removed from the tank 12 through outlet ports 32 located at the tank wall 22.

The sludge collector 18 retrieves the sludge that settles from the solution onto the bottom 20 of the tank 12. As shown in FIGS. 3–6, the sludge collector 18 includes a withdrawal manifold 34 and a scraper assembly 36. The withdrawal manifold 34 is a hollow covered cylindrical shell that is centrally mounted around the center pier 14 for rotation about the center pier 14. The withdrawal manifold 34 includes a rectangular top portion 38 and a cylindrical wall 40 that extends downwardly from the top portion 38.

The top portion 38 includes two opposing sides 42 and two adjacent sides 44 that are adjacent to the opposing sides 42. The withdrawal manifold 34 includes a floor seal 46 that is mounted to the bottom of the wall 40 to provide a seal between the wall 40 of the withdrawal manifold 34 and the bottom 20 of the tank 12. The withdrawal manifold 34 defines an interior cavity 48 and includes withdrawal ports 50 that are located on the wall 40 of the withdrawal manifold 34. A seal 52 closes a gap between the top portion 38 of the withdrawal manifold 34 and the center pier 14 to prevent fluid flow between the tank 12 and the interior cavity 48 through the gap. The withdrawal ports 50 are in fluid communication with the tank 12 and the interior cavity 48 of the withdrawal manifold 34. A sludge withdrawal line 54 is in fluid communication with the interior cavity 48 of the withdrawal manifold 34 and is used to remove the sludge from the interior cavity 48 of the withdrawal manifold 34.

The scraper assemblies 36 include scraper arms 56 and scraper blades 58 (FIG. 1). The scraper arms 56 are spiral-shaped and are connected to the wall 40 of the withdrawal manifold 34. The scraper arms 56 extend from the withdrawal manifold 34 adjacent to the withdrawal ports 50 toward the wall 22 of the tank 12. Tops 60 of the scraper arms 56 located adjacent to the withdrawal manifold 34 are substantially aligned with the top portion 38 of the withdrawal manifold 34, and the heights of the tops 60 of the scraper arms 56 with respect to the bottom 20 of the tank 12 increase as the scraper arms 56 extend radially outward away from the withdrawal manifold 34. Scraper blades 58 are connected to the bottom of the scraper arms 56 and extend downwardly toward the bottom 20 of the tank 12 such that the scraper blades 58 contact the bottom 20 of the tank 12.

A drive cage 62 surrounds the center pier 14 and is coupled to the withdrawal manifold 34 and the scraper assemblies 36. The scraper assemblies 36 are connected to the drive cage 62 by trusses 66. The drive cage 62 is rotated about the central axis 24 by a motor 68 that is mounted to the bridge 16. The drive cage 62 rotates the withdrawal manifold 34 and the scraper assembly 36 such that the scraper assemblies 36 move the sludge along the bottom 20 of the tank 12 toward the withdrawal manifold 34.

The sludge collector 18 includes entrapment plates 70 that are positioned above the withdrawal ports 50 and provide a physical barrier that traps transported sludge between the withdrawal manifold 34 and the scraper arms 56 and funnels the trapped sludge into the withdrawal ports 50 of the spiral sludge collector 18. The entrapment plates 70 are connected to, and extend substantially horizontally between, the top portion 38 of the withdrawal manifold 34 and the tops 60 of the scraper arms 56. Specifically, the entrapment plates 70 are connected to the opposing sides 42 of the top portion 38 of the withdrawal manifold 34 and extend in opposite directions to connect with the tops 60 of the respective scraper arms 56. The entrapment plates 70 include unfixed sides 72 which are substantially aligned with the adjacent sides 44 of the top portion 38 of the withdrawal manifold 34. The entrapment plates 70 extend away from the withdrawal manifold 34 a distance that is approximately equal to the radius R of the withdrawal manifold 34. The height of the entrapment plates 70 relative to the bottom 20 of the tank 12 increase as the entrapment plates 70 extend away from the withdrawal manifold 34 such that the entrapment plates 70 match the contour of the tops 60 of the scraper arms 56.

The circular clarifier 10 and the sludge collector 18 are continually operated to remove solids from the solution. During operation, the solution containing suspended solids is transferred from the influent line 28 up through the center pier 14 and into the tank 12 through the inlet ports 26. The solution slowly flows through the diffuser 30 to the outer wall 22 of the tank 12, at which time the solids separate and settle out of the solution onto the bottom 20 of the tank 12. The solids accumulate on the bottom 20 of the tank 12 to form a sludge. Clarified liquid is removed from the tank 12 from outlets located near the wall 22 of the tank 12 adjacent to the surface of the solution.

The drive motor 68 rotates the drive cage 62, withdrawal manifold 34, and the scraper assemblies 36. Rotation of the scraper assemblies 36 moves the sludge along the bottom 20 of the tank 12 toward the withdrawal manifold 34 and under the entrapment plates 70. The entrapment plates 70 trap the sludge between the withdrawal manifold 34 and the scraper assemblies 36 to prevent the sludge from passing over the tops 60 of the scraper arms 56. The entrapment plates 70 also funnel the sludge through the withdrawal ports 50 into the interior cavity 48 of the withdrawal manifold 34 where the sludge withdrawal line 54 discharges the sludge from the interior cavity 48 of the withdrawal manifold 34.

We claim:

1. A sludge collector for use with a circular clarifier including a tank having a bottom and a wall extending upwardly from the bottom, the tank being configured to contain a solution and allow sludge to settle from the solution to the bottom of the tank, the sludge collector comprising:

a withdrawal manifold at the bottom of the tank;

a scraper assembly extending from the withdrawal manifold toward the wall of the tank and for moving the settled sludge toward the withdrawal manifold; and an entrapment plate extending between the withdrawal manifold and the scraper assembly to trap sludge between the withdrawal manifold and the scraper assembly and funnel the trapped sludge into the withdrawal manifold, wherein the entrapment plate includes at least three sides and including a first side coupled to the withdrawal manifold, a second side coupled to the scraper assembly, and a third side connected to one of the first and second sides.

2. The sludge collector of claim 1, further comprising a sludge withdrawal line located within the withdrawal manifold, the sludge withdrawal line removing sludge from within the withdrawal manifold.

3. The sludge collector of claim 1, wherein the withdrawal manifold is rotatably coupled to the bottom of the tank, the sludge collector further comprising a drive cage coupled to the withdrawal manifold, the withdrawal manifold being rotated by the drive cage.

4. The sludge collector of claim 1, wherein the entrapment plate is substantially horizontal.

5. The sludge collector of claim 1, wherein the entrapment plate is positioned above the bottom of the tank a distance, the distance increasing as the entrapment plate extends away from the withdrawal manifold.

6. The sludge collector of claim 1, wherein the scraper assembly includes a scraper arm coupled to the withdrawal manifold and scraper blades coupled to the scraper arm.

7. The sludge collector of claim 6, wherein the scraper arm is spiral-shaped.

8. The sludge collector of claim 7, wherein the scraper blades extend downwardly from the scraper arm and contact the bottom of the tank.

9. The sludge collector of claim 1, wherein the withdrawal manifold is cylindrically shaped, the withdrawal manifold having a top portion and a wall portion that extends downwardly from the top portion to the bottom of the tank, the withdrawal manifold defining an interior cavity.

10. The sludge collector of claim 9, wherein the withdrawal manifold includes a seal that is coupled to the wall portion and contacts the bottom of the tank.

11. The sludge collector of claim 9, wherein the withdrawal manifold includes a withdrawal port in fluid communication with the tank and the interior cavity of the withdrawal manifold, the withdrawal port being located on the wall portion of the withdrawal manifold.

12. The sludge collector of claim 9, wherein the withdrawal manifold includes a radius, the entrapment plate extending away from the withdrawal manifold a distance that is approximately equal to the radius of the withdrawal manifold.

13. The sludge collector of claim 9, wherein the first side is coupled to the top portion of the withdrawal manifold.

14. The sludge collector of claim 13, wherein the scraper assembly includes a top, the second side being coupled to the top of the scraper assembly.

15. The sludge collector of claim 14, wherein the scraper assembly includes a height that is measured from the bottom of the tank to the top of the scraper assembly, the height increasing as the scraper assembly extends away from the withdrawal manifold toward the wall of the tank.

16. The sludge collector of claim 1, wherein the entrapment plate is triangular.

17. A sludge collector for use with a circular clarifier including a tank having a bottom and a wall extending upwardly from the bottom, the tank being configured to contain a solution and allow sludge to settle from the solution to the bottom of the tank, the sludge collector comprising:

a withdrawal manifold at the bottom of the tank;

a scraper assembly extending from the withdrawal manifold toward the wall of the tank and for moving the settled sludge toward the withdrawal manifold; and an entrapment plate extending between the withdrawal manifold and the scraper assembly to trap sludge between withdrawal manifold and the scraper assembly and funnel the trapped sludge into the withdrawal manifold, wherein the entrapment plate is positioned above the bottom of the tank a distance, the distance increasing as the entrapment plate extends away from the withdrawal manifold.

18. A sludge collector for use with a circular clarifier including a tank having a bottom and a wall extending upwardly from the bottom, the tank being configured to contain a solution and allow sludge to settle from the solution to the bottom of the tank, the sludge collector comprising:

a withdrawal manifold at the bottom of the tank, wherein the withdrawal manifold is cylindrically shaped, the withdrawal manifold having a top portion and a wall portion that extends downwardly from the top portion to the bottom of the tank, the withdrawal manifold defining an interior cavity;

a scraper assembly extending from the withdrawal manifold toward the wall of the tank and for moving the settled sludge toward the withdrawal manifold, wherein the scraper assembly includes a top, and wherein the scraper assembly includes a height that is measured from the bottom of the tank to the top of the scraper assembly, the height increasing as the scraper assembly extends away from the withdrawal manifold toward the wall of the tank; and an entrapment plate extending between the withdrawal manifold and the scraper assembly to trap sludge between the withdrawal manifold and the scraper assembly and funnel the trapped sludge into the withdrawal manifold, wherein the entrapment plate is coupled to the top portion of the withdrawal manifold, and wherein the entrapment plate is coupled to the top of the scraper assembly.

* * * * *